(12) United States Patent
Umkehrer

(10) Patent No.: US 11,566,946 B2
(45) Date of Patent: Jan. 31, 2023

(54) THERMOMETER

(71) Applicant: Endress+Hauser Wetzer GmbH+Co. KG, Nesselwang (DE)

(72) Inventor: Alfred Umkehrer, Hopefrau (DE)

(73) Assignee: Endress+Hauser Wetzer GmbH+Co. KG, Nesselwang (DE)

( * ) Notice: Subject to any disclaimer, the term of this patent is extended or adjusted under 35 U.S.C. 154(b) by 68 days.

(21) Appl. No.: 16/476,591

(22) PCT Filed: Oct. 30, 2017

(86) PCT No.: PCT/EP2017/077746
§ 371 (c)(1),
(2) Date: Jul. 9, 2019

(87) PCT Pub. No.: WO2018/127312
PCT Pub. Date: Jul. 12, 2018

(65) Prior Publication Data
US 2019/0353528 A1 Nov. 21, 2019

(30) Foreign Application Priority Data
Jan. 9, 2017 (DE) .................... 10 2017 100 267.7

(51) Int. Cl.
*G01K 1/16* (2006.01)
*G01K 13/02* (2021.01)
*G01K 15/00* (2006.01)
(52) U.S. Cl.
CPC ............... *G01K 1/16* (2013.01); *G01K 13/02* (2013.01); *G01K 15/005* (2013.01)

(58) Field of Classification Search
None
See application file for complete search history.

(56) References Cited

U.S. PATENT DOCUMENTS

2007/0259211 A1 11/2007 Wang
2009/0296773 A1 12/2009 Sattler
(Continued)

FOREIGN PATENT DOCUMENTS

CN 102165296 A 8/2011
CN 103154686 A 6/2013
(Continued)

OTHER PUBLICATIONS

Wärmeleitfähigkeit von hexangonalem Bornitrid; Henze bnp AG; Jun. 21, 2016.
(Continued)

*Primary Examiner* — Erica S Lin
(74) *Attorney, Agent, or Firm* — Mark A. Logan; Endress+Hauser (USA) Holding, Inc.

(57) ABSTRACT

The present disclosure relates to an apparatus for determining and/or monitoring temperature of a liquid and to a method for manufacturing a corresponding apparatus. The apparatus comprises at least one temperature sensor and a measuring element, wherein at least the temperature sensor and the measuring element are arranged in a single sensor head. Further arranged at least partially within the sensor head is at least one unit comprising a material with anisotropic thermal conductivity.

9 Claims, 2 Drawing Sheets

(56) References Cited

U.S. PATENT DOCUMENTS

| | | | | |
|---|---|---|---|---|
| 2012/0051389 A1* | 3/2012 | Schalles | ............... | G01K 15/002 374/1 |
| 2012/0287962 A1* | 11/2012 | Ooishi | ................ | G01N 33/225 374/37 |
| 2012/0303153 A1* | 11/2012 | Gershenfeld | ....... | B29C 35/0288 700/198 |
| 2019/0353528 A1 | 11/2019 | Umkehrer | | |

FOREIGN PATENT DOCUMENTS

| | | |
|---|---|---|
| DE | 4318486 A1 | 12/1994 |
| DE | 19941731 A1 | 3/2001 |
| DE | 60310302 T2 | 5/2007 |
| DE | 102010040039 A1 | 3/2012 |
| DE | 102015112425 A1 | 2/2017 |
| EP | 1247268 B2 | 8/2009 |
| EP | 2787334 A1 | 10/2014 |
| EP | 3566031 A1 | 11/2019 |
| GB | 2533079 A | 6/2016 |
| WO | 2018127312 A1 | 7/2018 |

OTHER PUBLICATIONS

Henze Boron Nitride Products AG, Wärmeleitfähigkeit von hexagonalem Bornitrid, www.henze-bnp.de/Bornitride-Lexikon/Waermeleitfehigkeit.html, Jan. 10, 2018, 1 page.

* cited by examiner

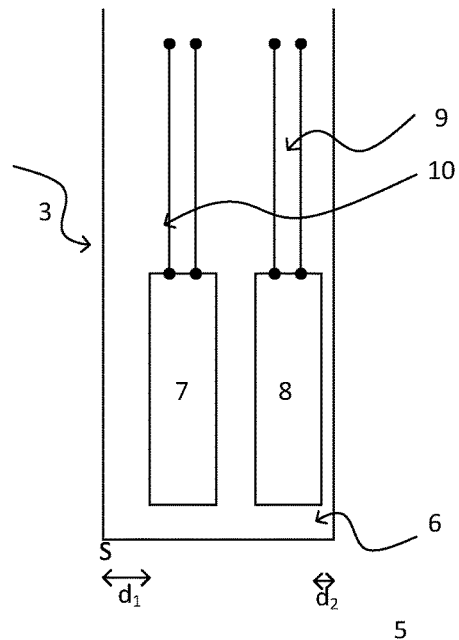
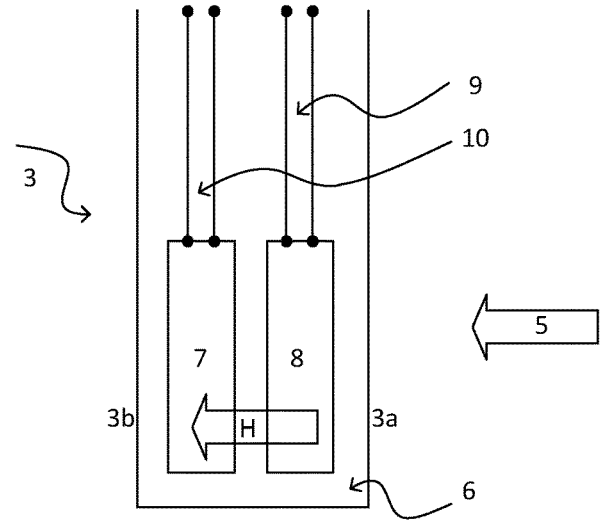
Fig. 2a
Fig. 2b
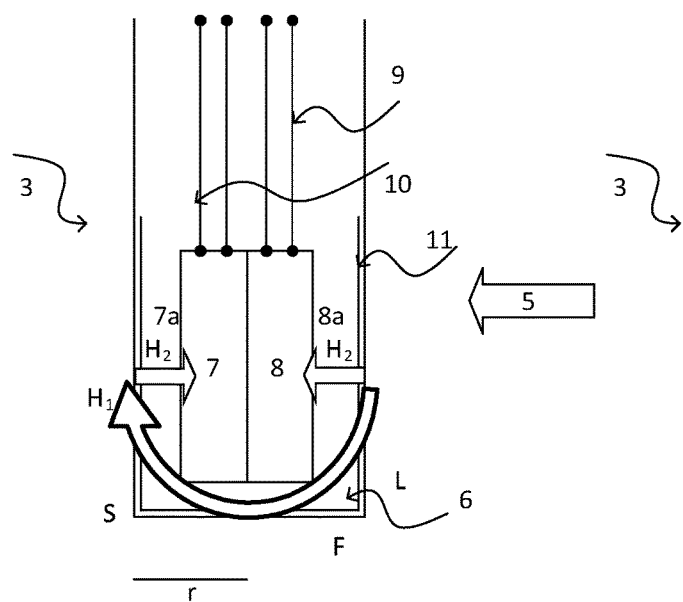
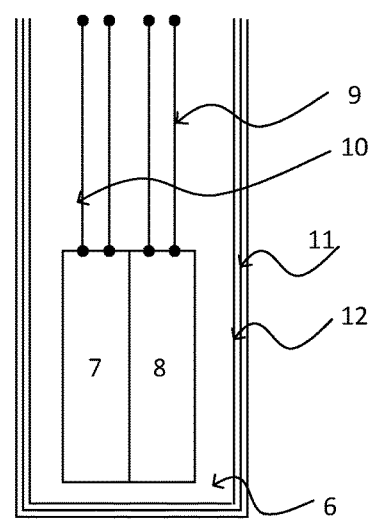
Fig. 3a
Fig. 3b

THERMOMETER

CROSS-REFERENCE TO RELATED APPLICATIONS

The present application is related to and claims the priority benefit of German Patent Application No. 10 2017 100 267.7, filed on Jan. 9, 2017 and International Patent Application No. PCT/EP2017/077746 filed on Oct. 30, 2017, the entire contents of which are incorporated herein by reference.

TECHNICAL FIELD

The invention relates to an apparatus for determining and/or monitoring temperature of a liquid and to a method for manufacturing an apparatus of the invention. The apparatus includes at least one temperature sensor and at least one measuring element, wherein the temperature sensor and the measuring element are accommodated in a single sensor head. The measuring element is preferably another sensor element, for example, an additional temperature sensor, a fixed point cell, or a reference element.

BACKGROUND

Known from DE4318486A1, for example, is a temperature sensor with two temperature measuring elements, both of which are arranged on the floor of a tubular sensor housing.

Known from DE19941731A1 for calibrating a thermometer in the installed state is a miniaturized fixed point cell provided in a thermometer and filled with a fixed point substance, e.g. a metal or a eutectic alloy. Likewise known from EP1247268B2 for the purpose of calibrating and/or validating a thermometer is, for example, a method for in-situ calibration of a plurality of integrated temperature sensors based on characteristic lines or curves of one or more reference elements in the form of the secondary temperature sensors. The reference elements are installed in a thermometer insert supplementally to a primary temperature sensor.

Furthermore, known from DE102010040039A1 are an apparatus and a method for in-situ calibration of a thermometer having a temperature sensor and a reference element for calibrating the temperature sensor, in the case of which the reference element is composed at least partially of a ferroelectric material, which experiences a phase transformation at at least one predetermined temperature in the temperature range relevant for calibrating the temperature sensor. The calibration is thus based on the characteristic temperature point of a phase transformation of a ferroelectric material, thus performed based on a material-specific property. A similar apparatus is subject matter of German patent application No. 102015112425.4 unpublished at the date of first filing of this application. The thermometer described there includes at least one temperature sensor and at least two reference elements contacted via exactly two connection wires and being at least partially of two different materials, each of which has in the temperature range relevant for calibrating the temperature sensor at least one phase transformation at least of second order at, in each case, a predetermined phase transformation temperature. DE 102010040039A1 (U.S. Pat. No. 9,091,601) as well as DE 102015112425.4 (US 2018217010) are incorporated here by reference.

In the case, in which a thermometer having a temperature sensor and an additional measuring element arranged in the same sensor head is used for a liquid, for example, a flowing liquid, with a temperature profile, which is inhomogeneous at least at times, it can happen that the temperature sensor and the other measuring element, each of which are arranged at different positions within the sensor head, are exposed, at least at times, to different temperatures. The temperature sensor and the measuring element are then at least at times not in thermal equilibrium, which can lead disadvantageously to errors and measurement inaccuracies.

SUMMARY

An object of the present invention is to provide an apparatus for determining and/or monitoring temperature of a liquid with a high accuracy of measurement, and to provide a method for manufacture of the apparatus.

The object is achieved by an apparatus as defined in claim 1 and by a method as defined in claim 15.

The apparatus of the invention serves for determining and/or monitoring temperature of a liquid and includes at least one temperature sensor and a measuring element, wherein at least the temperature sensor and the measuring element are arranged in a single sensor head. Furthermore, at least partially arranged within the sensor head is a unit, which includes a material with anisotropic thermal conductivity.

For determining and/or monitoring temperature of a liquid, the sensor head is brought in contact, especially thermal contact, with the liquid. Heat exchange occurs between the apparatus and the liquid, until thermal equilibrium is established. Then, the sensor head and the liquid have essentially the same temperature, in the following referred to as the equilibrium temperature. For the sensor head, a heat flow occurs starting from its liquid facing surface into the interior of the sensor head. Heat movement in this connection includes both a heat flux from the liquid to the sensor head, corresponding to the case, in which the liquid has a higher temperature than the sensor head, as well as also in the reverse direction, in the case, in which the sensor head has a higher temperature. In thermal equilibrium, the temperature sensor and the measuring element have essentially the same temperature.

In the case of conventional thermometers having at least two measuring elements arranged in a single sensor head, whereof at least one measuring element is a temperature sensor, different cases can occur, in which thermal equilibrium is not present at all times. The temperature sensor and the measuring element are thus exposed to different temperatures at certain points in time lying before points in time, at which the equilibrium temperature is established. This can be caused, on the one hand, by an, especially constructively related, asymmetric arrangement of the temperature sensor and the measuring element within the sensor head. For example, the temperature sensor and the measuring element can be arranged at different distances from the outer enclosure of the sensor head. Another case is when the apparatus is exposed to an at least timewise and/or partially dynamic and/or inhomogeneous thermal environment, for example, in the case of application in a flowing liquid. Then, in the case of a change of the temperature of the liquid from a first temperature to a second temperature, the region of the sensor head facing upstream against the flow direction is exposed to the second temperature at an earlier point in time than the region of the sensor head facing downstream in the flow direction of the liquid. Again, the result is that the temperature sensor and the measuring element are exposed to different temperatures at a certain point in time, which lies before the point in time, at which the equilibrium temperature is established. Of course, a number of other cases can lead to a temperature difference arising at least at times between the temperature of the temperature sensor and the temperature of the measuring element. When, for example, the temperature measured by means of the temperature sensor and the, especially physical or chemical, especially temperature dependent, variable, for example, likewise a temperature, ascertained by means of the measuring element are related in an, especially mathematical, relationship, in order, for example, to ascertain a temperature measured value or to perform a calibration/validation, errors and/or measurement inaccuracies can result.

In order to prevent the described problems, the unit of the invention is provided, which includes at least partially a material with anisotropic thermal conductivity. The thermal conductivity of the unit is directionally dependent. Thus, the heat flow within the sensor head can be influenced by an embodiment of the unit specially designed, advantageously with targeting, for a certain application.

In a preferred embodiment, the unit is embodied to assure that at least the temperature sensor and the measuring element are at all times essentially in thermal equilibrium. Preferably, the unit thus assures that, especially independently of the thermal environment of the apparatus, a homogeneous heat flow occurs within the sensor head. The unit is especially preferably embodied in such a manner that, in the case of a change of the temperature of the liquid, essentially the same temperature reigns at all times in the region of the temperature sensor and in the region of the measuring element. If the measuring element is, for example, an additional temperature sensor, it is thus assured that no measured value differences occur between the temperatures determined by means of the two temperature sensors, for example, as a result of an asymmetric arrangement within the sensor head, or in the case of flowing media. Similarly, the unit assures, when the measuring element is a fixed point cell or a reference element for calibration and/or validation of the temperature sensor, that a temperature determined by means of the reference element can be compared directly with the temperature of the temperature sensor measured at essentially the same point in time.

In an embodiment of the apparatus of the invention, the measuring element is a second temperature sensor. The first and second temperature sensors serve, for example, to provide a redundancy in the determining and/or monitoring of temperature of the liquid.

In an alternative embodiment of the apparatus of the invention, the measuring element is a reference element for in-situ calibration and/or validation of at least the temperature sensor, wherein the reference element is composed at least partially of at least one material, in the case of which at least one phase transformation occurs at at least one predetermined phase transformation temperature in a temperature range relevant for calibrating the first temperature sensor. During the phase transformation, the material remains in the solid phase.

With reference to the embodiment with at least one reference element, compare DE102010040039A1 as well as German patent application No. 102015112425.4, both of which concern such reference elements. In such case, a temperature sensor (primary sensor) is calibrated and/or validated using at least one, secondary sensor (reference element) likewise located in the thermometer insert, or sensor head. If at least two reference elements are provided, besides a so-called one-point calibration and/or validation, also a so-called multipoint calibration and/or validation is possible.

In the case of a phase transformation in a material, which remains in the solid phase, involved, for example, according to the Ehrenfest classification, is a phase transformation at least of second order. In contrast to a phase transformation of first order, no or only a negligible amount of latent heat is released during the phase transformation. When no or only a negligible amount of latent heat is released, it can—basically and independently of the selected classification for phase transformations—, among other things, be advantageously assured that the temperature measured by means of the temperature sensor at the point in time of the occurrence of a phase transformation, is not corrupted, especially not by released, latent heat.

In an additional classification of phase transformations significantly more usual in the present state of the art, it is distinguished only between discontinuous (first order) and continuous (second order) phase transformations [compare e.g. Lexikon der Physik, Spektrum Akademischer Verlag, Heidelberg, Berlin, Vol. 4, under the entry, "Phaseübergänge and andere kritische Phänomene" (Phase Transformations and Other Critical Phenomena). According to this classification, various ferroelectric materials can be associated with both phase transformations of first as well as also second order, wherein in both cases the particular material, for which a phase transformation occurs, remains in the solid phase during the phase transformation.

A phase transformation includes a discontinuity in the second derivative of a thermodynamic variable, such as, for example, the pressure, the volume, the enthalpy, or the entropy, as a function, for example, of temperature. Usually, phase transformations involve the change of a certain specific material property, for example, an alternation in the crystal structure, or an alternation in the magnetic, electrical or dielectric properties. These material-specific changes are known for the particular reference element and can be taken into consideration for a calibration and/or validation of a temperature sensor. In such case, the at least one reference element can have one or more phase transformations, especially phase transformations in the solid phase of the utilized material. Each phase transformation occurs at a certain characteristic, fixed and long term stable, temperature value, so that, in principle, no drift and/or no aging effects need to be taken into consideration for the reference element.

It is thus advantageous that the material be a ferroelectric material, a ferromagnetic material, or a superconductor, especially a high temperature superconductor. The phase transformations arising in the case of these materials concern phase transformations from the paraelectric phase into the ferroelectric phase and vice versa, from the paramagnetic phase into the ferromagnetic phase and vice versa, as well as phase transformations from the normally conducting state into the superconducting state and vice versa.

A ferroelectric material, also called a ferroelectric, is a material, which, below a so-called material-specific ferroelectric Curie temperature, can have an electrical polarization, even in the absence of an electric field. This phenomenon is correspondingly only observed in the case of crystal structures, wherein the forming of a polar axis is possible. Upon exceeding the ferroelectric Curie temperature, a phase transformation from the ferroelectric into the paraelectric state occurs, and vice versa, which is accompanied by the disappearance or the forming of a polarization of the material. In the case of such a phase transformation, then, for example, a distinctive curve of the dielectric constant as a function of temperature can be observed, which can be taken into consideration for calibration and/or validation of the temperature sensor. Similar behavior is observed in the case of applying a ferromagnetic material. At the so-called Curie temperature, a phase transformation from the ferromagnetic in the paramagnetic state occurs, or vice versa, wherein a magnetization of the material disappears above the Curie temperature.

The unit preferably surrounds, at least partially, at least the temperature sensor and/or the measuring element.

In an additional, preferred embodiment of the apparatus of the invention, the unit comprises a layer or a coating, which layer or coating is composed at least partially of the material with anisotropic thermal conductivity. The layer has preferably in the longitudinal direction, thus along a plane in parallel with the layer or coating, a greater thermal conductivity than perpendicular thereto, i.e. perpendicular to the plane. In this way, the heat flow is redistributed within the sensor head, with targeting, along the unit.

In an especially preferred embodiment, the unit comprises a thin walled foil, which is composed at least partially of the material with anisotropic thermal conductivity. The foil has likewise preferably along its longitudinal axis a higher thermal conductivity than perpendicular thereto.

In an additional embodiment of the apparatus of the invention, a filler is provided, which is arranged at least partially within the sensor head, and fills an interior of the sensor head at least partially, preferably completely. The unit, which likewise is arranged at least partially within the sensor head, is preferably likewise at least partially surrounded by the filler. The filler is, for example, a cement, especially a mixture of magnesium oxide, zirconium silicate and magnesium phosphate In such case, the filler advantageously has an essentially homogeneous thermal conductivity and/or thermal capacitance. The filler assures thus an essentially homogeneous heat flow, especially an isotropic heat flow, within the sensor head.

In an especially preferred embodiment, the material with anisotropic thermal conductivity is an at least partially carbon containing material, especially graphite, or hexagonal boron nitride.

Another, especially preferred embodiment provides that the unit is embodied and/or arranged in such a manner that it has in parallel with the peripheral direction of the sensor head a higher, especially at least 10-times higher, especially at least 30-times higher, thermal conductivity than perpendicular to the peripheral direction. This embodiment is especially advantageously suitable for use in an at least at times and/or partially dynamic and/or inhomogeneous thermal environment, for example, for applications in flowing media.

Advantageously, the unit is embodied and/or arranged in such a manner that it at least partially surrounds the temperature sensor and the measuring element. The unit thus provides for a heat distribution in the peripheral direction of the sensor head.

An embodiment of the invention provides that the unit is secured at least partially on a portion of a wall of the sensor head facing the interior of the sensor head. The unit is thus arranged in the region of the surface of the sensor head facing the liquid. The unit provides a peripheral distribution of a heat flow along the surface of the sensor head. Starting from the surface of the sensor head, there occurs then, in the case of a corresponding embodiment of the sensor head, advantageously an essentially homogeneous heat flow into the interior of the sensor head.

For this embodiment, it is advantageous that the unit be secured to the wall of the sensor head by means of at least one part of the filler, and/or by means of a securement element, for example, in the form of a tubular element. The tubular element is especially a ceramic tube, which has an outer diameter, which essentially corresponds to an inner diameter of the sensor head, or is slightly less than the inner diameter of the sensor head in such a manner that the tubular element can be arranged essentially accurately fit within the sensor head.

The object of the invention is, furthermore, achieved by a method for manufacturing an apparatus of the invention, which apparatus comprises a temperature sensor and a measuring element arranged in a single sensor head. According to the invention, there is arranged at least partially within the sensor head at least one unit comprising at least partially a material with anisotropic thermal conductivity.

In an embodiment of the method, the unit is at least partially secured in the region of a wall of the sensor head facing the liquid. In such case, it is advantageous that the unit is secured to the wall of the sensor head by means of at least one part of the filler, and/or by means of a securement element, for example, in the form of a tubular element.

The embodiments explained in connection with the apparatus can be applied mutatis mutandis also for the proposed method.

BRIEF DESCRIPTION OF THE DRAWINGS

The invention will now be explained in greater detail based on the appended drawing, the figures of which show as follows:

FIG. 2 shows different possible arrangements of the two measuring elements within the temperature sensor; and FIG. 3 shows preferred embodiments of a sensor head of the present disclosure.

DETAILED DESCRIPTION

Figure 1:
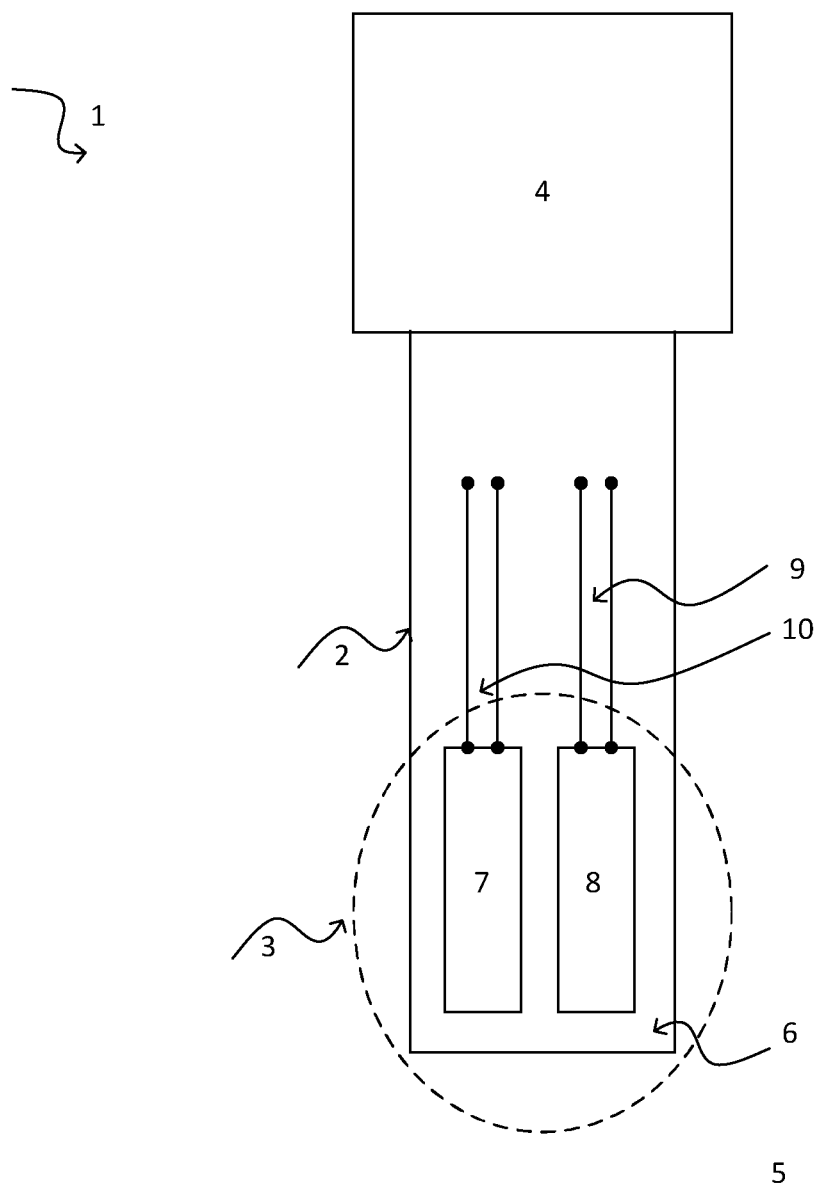
FIG. 1 shows a schematic representation of a thermometer having two measuring elements arranged within a sensor head according to the state of the art.

FIG. 1 is a schematic view of an embodiment of a thermometer 1 with a protective tube 2 and an electronics unit 4 according to the state of the art. The portion of the protective tube 2 contacting the liquid 5 is also referred to as the sensor head 3. The internal volume of the sensor head 3 is filled with a filler 6, especially an electrically insulating filler, especially a cement. Further arranged in the interior of the sensor head 3 are a temperature sensor 7 and a measuring element 8, each of which is electrically contacted by means of two connection wires, 9,10 and connected with the electronics unit 4. The temperature sensor 7 is, for example, a resistance element or thermocouple. The measuring element 8 is, in turn, for example, an additional temperature sensor, a fixed point cell, or a reference element. However, also other sensors can serve as measuring element 8.

The number of connection wires 9,10 needed for contacting a particular measuring element 7,8 can vary, depending on type of measuring element 7,8 and depending on applied measuring principle.

For purposes of a high accuracy of measurement, it must be assured that the two measuring elements 7,8, of which one is a temperature sensor 7, in the ideal case are located at all times in thermal equilibrium. In order to achieve this, different measures are usually performed, of which some are listed in the following, by way of example:

1. The at least two measuring elements 7,8 are arranged symmetrically within the sensor head 3, especially symmetrically with respect to an imaginary axis extending in the longitudinal direction of the protective tube 2 through a center of the protective tube 2.
2. The at least two measuring elements 7,8 are thermally coupled (e.g. soldered) as well as possible.
3. In the case, in which both measuring elements 7,8 are temperature sensors, which are arranged on a substrate [not shown], the two support substrates have the same thermal conductivity.
4. The measuring elements 7,8 are embodied in such a manner that they have the same thermal capacitance.
5. A filler 6 surrounding the measuring elements or partitions [not shown] arranged in the region of the sensor head 3 are formed in such a manner that they assure an isotropic and/or homogeneous heat flow within the sensor head 3.
6. All components of at least the sensor head 3 are embodied in such a manner that they have a best possible thermal conductivity, in order that especially influences of an inhomogeneous thermal environment in the vicinity of the sensor head (for example, a one sided flow of a liquid 5) only lead for as limited as possible time periods to a thermal non-equilibrium of the two measuring elements 7,8. Disadvantageously, the measuring elements 7,8, when the components surrounding these have a high thermal conductivity, are, however, also completely exposed to the temperature variations of the inhomogeneous thermal environment.

Even with greatest care with reference to the manufacture of a thermometer 1 having at least two measuring elements 7,8 arranged in a single sensor head 3, still, different cases can occur, in which the temperature sensor 7 and the measuring element 8 are, at least at times, not in thermal equilibrium and, correspondingly, are exposed to different temperatures. Independently of whether the measuring element 8 is an additional temperature sensor, a reference element, a fixed point cell, or another type of sensor, by means of which an, especially physical or chemical, especially temperature dependent, variable is ascertained and/or monitored, this can lead to considerable errors and/or measurement inaccuracies.

By way of example, FIG. 2 illustrates two cases, where the temperature sensor and the measuring element are not at all times in thermal equilibrium.

Resulting from structural constraints, for example, an asymmetric arrangement of the temperature sensor 7 and the measuring element 8 can happen. As shown in FIG. 2a, for example, the temperature sensor 7 and the measuring element 8 can be arranged at different distances $d_1$, and $d_2$, from enclosure S, the surface of the sensor head 3. In the case of a temperature change of the liquid 5 from a first temperature $T_1$ to a second temperature $T_2$ in the case shown in FIG. 2a, the measuring element 8 reaches the second temperature $T_2$ at an earlier point in time than the temperature sensor 7.

FIG. 2a involves one example of a structurally related asymmetry in the construction of a thermometer 1. Of course, also other asymmetric constructions are possible, for which the problems described in the context of the present invention likewise can occur.

A further case relates, as illustrated in FIG. 2b, to use of the apparatus in an at least at times and/or partially dynamic and/or inhomogeneous thermal environment. Involved in this case is an application in a flowing liquid 5. A temperature change of the liquid 5 from a first temperature $T_1$ to a second temperature $T_2$ leads to the fact that a portion 3a of the sensor head 3 facing against the flow direction of the liquid 5 reaches the second temperature $T_2$ at an earlier point in time than a portion 3b of the sensor head 3 facing in the flow direction of the liquid 5. Thus, also in this case, the measuring element 8 reaches the second temperature $T_2$ at an earlier point in time than the temperature sensor 7.

The problems illustrated by the above discussed examples, and the errors associated therewith in the making of a measurement, and the measurement inaccuracy resulting from such problems can be prevented by means of the present invention, especially by means of the unit 11 comprising at least partially a material with anisotropic thermal conductivity.

FIG. 3 shows, likewise by way of example, two preferred embodiments for an apparatus 1 of the invention in schematic representation. The two examples shown in FIG. 3 each involve a unit 11 formed as a thin foil of graphite. Of course, also other embodiments are possible for the unit 11, and such fall equally within the scope of the present invention. Unit 11 assures that at least the temperature sensor 7 and the measuring element 8, which in FIG. 3 are arranged in direct contact with one another, are at all times essentially in thermal equilibrium. The temperature sensitive portions 7a,8a of the measuring elements 7,8 face in opposite directions.

Unit 11 is arranged in the region of the outer enclosure S, the surface of the sensor head 3, which in this embodiment is embodied, by way of example, cylindrically. Thus, the unit 11 surrounds the temperature sensor 7 and the measuring element 8 along a floor F and along a portion of the lateral surface L of the sensor head 3. Unit 11 is especially arranged symmetrically around the two measuring elements 7,8. A symmetric arrangement is, however, not absolutely necessary.

In the embodiment of FIG. 3a, unit 11 is secured in the interior of the sensor head 3 to its enclosure S. This can be implemented, for example, by stamping from a planar graphite foil, on the one hand, a first element, which is matched in its dimensions to the floor F, thus in the present case circular, as well as a second element, which is matched to the dimensions of at least one portion of the lateral surface and consequently in the present case is rectangular (comprises thus S1 and S3). The wall piece can in an additional working step be preformed, for example, corresponding to the radius r of the sensor head 3, for example, using a round rod. Both elements can then be inserted into the sensor head 3.

Unit 11 has in parallel with the peripheral (circumferential) direction—along the surface S—of the sensor head 3 an, especially significantly, higher thermal conductivity than perpendicular to the peripheral direction. In the case of a temperature change of the liquid 5 from a first temperature $T_1$ to a second temperature $T_2$, the heat flow occurs first along the surface S of the sensor head (H1) and then, especially homogeneously, from the surface S into the interior of the sensor head 3 and to the temperature sensor 7 and the measuring element 8 (H2). In this way, the temperature sensor 7 and the measuring element 8 are located at all times essentially in thermal equilibrium.

The interior of the sensor head is filled with a filler 6, which has essentially a homogeneous thermal conductivity and/or thermal capacitance. Unit 11 is, in such case, secured by means of a part of the filler 6 in the interior of the sensor head 3 to its enclosure S. For this, for example, after insertion of the unit 11 into the sensor head 3, a first portion of filler can be filled into the sensor head 3 and oriented by means of a formed part in such a manner that the unit 11 is essentially completely covered by a thin layer of filler 6. Then, the temperature sensor 7 and the measuring element 8 can be introduced into the sensor head 3, and the remaining internal volume of the sensor head 3 likewise filled with the filler 6.

A second embodiment of an apparatus of the invention is shown in FIG. 3b. This embodiment differs from that of FIG. 3a only in the manner of securement of the unit 11 within the sensor head 3. Elements already explained in connection with FIG. 3a are therefore not explained here again. For the embodiment in FIG. 3b, unit 11 is secured within the sensor head by means of a securement element 12. Securement element 12 is preferably matched in its dimensions to the geometry of the sensor head 3. First, the unit 11 is, for example, introduced into the sensor head 3, corresponding to the variant described in connection with FIG. 3a. Directly following, the securement element 12, here in the form of a tubular element, is pushed into the sensor head 3, in such a manner that the securement element 12 is essentially completely in contact with the unit 11.

The invention claimed is:

1. An apparatus for determining or monitoring a temperature of a liquid, comprising:
   a cylindrical sensor head;
   a temperature sensor and a measuring element arranged within the cylindrical sensor head; and
   a unit arranged within the cylindrical sensor head and embodied of a material with anisotropic thermal conductivity, wherein the unit includes:
      a first element matched in dimensions to a circular floor of the cylindrical sensor head and disposed within the cylindrical sensor head on the circular floor; and
      a second element matched in dimensions to an inner circumference of the cylindrical sensor head and disposed within the cylindrical sensor head along the inner circumference,
      wherein the first element and the second element surround the temperature sensor and the measuring element, and
      wherein the second element has a higher thermal conductivity in a direction along the inner circumference than in a direction perpendicular to the inner circumference,
   wherein the unit is designed to influence the heat flow within the sensor head such that the temperature sensor and the measuring element are in thermal equilibrium at all times and the spread of heat within the sensor head is homogeneous irrespective of the thermal environment of the apparatus.

2. The apparatus of claim 1, wherein the measuring element is a second temperature sensor.

3. The apparatus of claim 1, wherein the measuring element is a reference element for in-situ calibration or validation of at least the temperature sensor, wherein the reference element is composed at least partially of at least one material, in the case of which at least one phase transformation at least of second order occurs at at least one predetermined phase transformation temperature in a temperature range relevant for calibrating the temperature sensor, in the case of which phase transformation the material remains in the solid phase.

4. The apparatus of claim 3, wherein the material of the reference element is a ferroelectric material, a ferromagnetic material, or a superconductor.

5. The apparatus of claim 1, wherein the unit comprises a layer or a coating, wherein the layer of the coating is composed at least partially of the material with anisotropic thermal conductivity.

6. The apparatus of claim 1, wherein the unit comprises a thin walled foil composed at least partially of the material with anisotropic thermal conductivity.

7. The apparatus of claim 1, wherein a filler is provided that is arranged at least partially within the sensor head and fills an interior of the sensor head at least partially.

8. The apparatus of claim 7, wherein the filler has a homogeneous thermal conductivity or thermal capacitance.

9. The apparatus of claim 1, wherein the material with anisotropic thermal conductivity at least partially contains carbon containing material or hexagonal boron nitride.

* * * * *